United States Patent [19]
Haubs et al.

[11] Patent Number: 5,905,137
[45] Date of Patent: May 18, 1999

[54] PROCESS FOR PREPARING SULFUR-CONTAINING POLYMERS

[75] Inventors: Michael Haubs, Bad Kreuznach; Reinhard Wagener, Flörsheim, both of Germany; Afif Nesheiwat, Madison, N.J.

[73] Assignee: Hoechst Aktiengesellschaft, Frankfurt, Germany

[21] Appl. No.: 08/752,060

[22] Filed: Nov. 19, 1996

[51] Int. Cl.$^6$ .................................................... C08G 75/14
[52] U.S. Cl. ........................... 528/388; 528/487; 528/501
[58] Field of Search .................................. 528/388, 487, 528/501

[56] References Cited

U.S. PATENT DOCUMENTS

| | | | |
|---|---|---|---|
| 4,760,128 | 7/1988 | Ebert et al. | 528/388 |
| 4,761,468 | 8/1988 | Okamoto et al. | 528/388 |
| 4,820,801 | 4/1989 | Inoue et al. | 528/388 |

*Primary Examiner*—Robert Dawson
*Assistant Examiner*—D. Aylward
*Attorney, Agent, or Firm*—Frommer Lawrence & Haug LLP

[57] ABSTRACT

The present invention relates to a process for preparing sulfur-containing polymers from at least one sulfide and at least one aromatic dihalo compound in a solvent, which comprises a) reacting the sulfide with a stoichiometric excess of aromatic dihalo compound, b) largely removing the excess aromatic dihalo compound and c) further polymerizing the mixture.

20 Claims, No Drawings

PROCESS FOR PREPARING SULFUR-CONTAINING POLYMERS

The invention relates to a process for preparing linear or branched sulfur-containing polymers such as polyarylene sulfides, in particular polyphenylene sulfide (PPS).

U.S. Pat. No. 4,910,294 describes a process for preparing PPS. Aromatic dihalo compounds, in particular dichlorobenzene (DCB), are used as monomers and are reacted with sodium sulfide in a high-boiling, dipolar aprotic solvent such as N-methylpyrrolidone (NMP).

EP 0256757, EP 0259984, EP 0720998 and U.S. Pat. No. 4,794,164 describe the preparation of PPS in two steps. In the first step, dichlorobenzene and sodium sulfide are reacted in a polar solvent to form a prepolymer. In a second reaction stage, water is added and the two-phase reaction mixture is heated to at least 255° C. to convert the prepolymer into a higher molecular weight polymer.

These preparative processes of the prior art are in need of improvement, in particular with regard to the space-time yield of the reactors. To achieve a good space-time yield, shortening of the reaction time is advantageous. In addition, the high reaction temperatures and long reaction times of the prior art processes result in formation of undesired by-products which have to be separated from the product and disposed of.

EP 737705 describes the preparation of PPS by polymerization of chlorine-terminated prepolymers for short reaction times at low reaction temperatures. However, carrying out this process requires complicated apparatus since more than one reaction vessel generally has to be used. The preparation of PPS via chlorine-terminated prepolymers in one reaction vessel is therefore desirable.

It is therefore an object of the invention to prepare sulfur-containing polymers, in particular polyarylene sulfides, over a wide molar mass range (e.g. $M_w$=10,000–200,000 g/mol) in a good space-time yield under very mild reaction conditions with very little contamination by by-products, with the entire process being carried out in one reaction vessel.

It has been found that in the preparation of sulfur-containing polymers, in particular polyarylene sulfides, from aromatic dihalo compounds and sulfides the abovementioned disadvantages can be avoided by reacting a sulfide with a stoichiometric excess of aromatic dihalo compound, removing the excess dihalo compound after a conversion of 40–99% (based on sulfide) and then further polymerizing the reaction mixture.

The invention accordingly provides a process for preparing sulfur-containing polymers from at least one aromatic dihalo compound and at least one sulfide in a solvent, which comprises a) reacting the sulfide with excess aromatic dihalo compound, b) largely removing the excess aromatic dihalo compound at a conversion of 40–99% based on sulfide and c) further polymerizing the reaction mixture, if desired after addition of small amounts of sulfide.

For the purposes of the present invention, sulfur-containing polymers are preferably polymers comprising arylene sulfide units. The arylene constituents of the arylene sulfide units comprise monocyclic or polycyclic aromatics or linked aromatics. The aromatics can also contain heteroatoms. Such aromatics, which may be substituted or unsubstituted, are, for example, benzene, pyridine, biphenyl, naphthalene, phenanthrene. Substituents are, for example, $C_1$–$C_6$-alkyl, $C_1$–$C_6$-alkoxy, carboxyl, amino and suffonic acid groups. Linked aromatics are, for example, biphenyl, aromatics linked via ether bridges (arylene ethers) or aromatics linked via keto groups (arylene ketones).

Preferred sulfur-containing polymers are polyarylene sulfides, in particular polyphenylene sulfide.

Suitable aromatic dihalo compounds which can be used as starting compounds for the preparation of the above-described sulfur-containing polymers are the corresponding dihalogenated aromatic hydrocarbons, where the halogen used may be fluorine, bromine or iodine, particularly preferably chlorine. Examples are dihalobenzenes such as o-, m- and p-dichlorobenzene, substituted dihalobenzenes such as 2,5-dichlorotoluene, 3,5-dichlorobenzoic acid, 2,5-dichlorobenzenesulfonic acid or 3,5-dichlorobenzenesulfonic acid or salts thereof. However, dihalonaphthalenes such as 1,4-dibromonaphthalene or bis(halophenyl) ethers such as 4,4'-dichlorodiphenyl ether can also be used. It is likewise possible to use mixtures of various arylene dihalides, giving copolymers. Small amounts (from 0.02 to 5 mol percent based on dihaloaromatic) of polyhalogenated aromatic hydrocarbons can also be added to obtain branched or crosslinked sulfur-containing polymers.

Suitable sulfides for the preparation of the polymers are inorganic and organic sulfides. Inorganic sulfides are sulfides of the alkali metals and alkaline earth metals, for example lithium sulfide, potassium sulfide, calcium sulfide and preferably sodium sulfide. It is also possible to use the corresponding hydrogen sulfides or hydrogen sulfide, if desired in combination with alkali metal hydroxides.

Suitable organic sulfides are salt-like sulfides containing organic cations. For the purposes of the invention, organic sulfides also include those organic sulfur compounds which liberate sulfide or hydrogen sulfide anions under the reaction conditions, for example thioacetamide, carbon disulfide or thio-N-methylpyrrolidone. The sulfides can also contain water of crystallization.

Dihaloaromatics and sulfide are generally also described as monomers.

Suitable solvents for preparing the polymer are polar, preferably aprotic, solvents of the amide type such as dimethylformamide (DMF), dimethylacetamide (DMAc), N-methylcaprolactam or N-alkylated pyrrolidones such as N-methylpyrrolidone (NMP) or mixtures thereof. Particular preference is given to NMP.

To prepare the sulfur-containing polymer by the process of the invention, the sulfide is reacted in step a) with excess aromatic dihalo compound in a solvent to a conversion of 40–99% (based on the sulfide). The stoichiometric excess of aromatic dihalo compound is from 1 to 200 mol %, preferably from 3 to 100 mol % and particularly preferably from 5 to 50 mol %, based on the sulfide.

In step b), the excess aromatic dihalo compound is largely removed from the reaction mixture, for example by distillation. The distillation can also be carried out as a steam distillation.

The reaction mixture which has been largely freed of dihalo compound comprises predominantly chlorine-terminated polymers which are subsequently further polymerized in step c) under atmospheric or superatmospheric pressure, if necessary by means of further addition of sulfur compound. Finally, the polymer is isolated from the reaction mixture and purified by conventional methods.

The reaction conditions for step a) can be varied within wide limits. Thus, the reaction temperatures can be between 160° C. and 280° C., preferably from 190° C. to 260° C. The reaction times can be from 10 minutes to 20 hours, preferably from 0.5 to 3 hours. Temperature programs can also be advantageously used, e.g. 30 minutes at 225° C. and subsequently 1 hour at 245° C.

The mean molar mass of the polymers, expressed as the weight average $M_W$, after step a) is generally in the range from 1,000 to 30,000 g/mol, preferably from 2,000 to 20,000 g/mol and particularly preferably from 3,000 to 15,000 g/mol.

After conclusion of step a), excess aromatic dihalo compound is removed in step b) using suitable methods.

The removal of the excess aromatic dihalo compound from the reaction mixture is carried out at a conversion based on sulfide of 40–99%, preferably 50–98%, particularly preferably 60–97%. The excess aromatic dihalo compound should generally be removed to a substantial extent. According to the invention, from 30 to 100%, preferably 50–99%, particularly preferably 70–98%, of the excess aromatic dihalo compound is removed in step b).

The removal of the excess aromatic dihalo compound can be carried out by simple distillation, if desired under pressure. The distillation is generally carried out at temperatures of 100° C.–300° C. and pressures of from 0.5 to 10 bar. The distillation can also be carried out as a steam distillation, for which purpose steam is advantageously passed through the reaction mixture or water is added in the distillation.

Apart from water and aromatic dihalo compound, solvent is also removed in the distillation. The resulting increase in concentration of the polymer is desired in many cases, since it favors the further reaction of the polymer in step c). It has been found to be advantageous to increase the concentration until the weight ratio of solvent to polymer is between 4:1 and 1:1, preferably between 3:1 and 2:1. If more solvent is distilled off during the distillation than is desired for the optimum polymer concentration, the polymer concentration can be adjusted to the desired value by addition of pure solvent.

During the reaction in step a), chemically bound water of hydration is usually liberated and this is also distilled off during the removal of the excess aromatic dihalo compound.

The distilled-off mixture of solvent, water and aromatic dihalo compound is advantageously fractionated in a distillation column and separated into its constituents which can be used again.

The reaction mixture is then, if desired after addition of a small amount of sulfide, further polymerized in step c). The molar amounts of sulfide which can be added in step c) are usually from 0 to 15 mol %, preferably from 0.1 to 5 mol % and particularly preferably from 0.5 to 3 mol %, based on the amount of sulfide used in step a).

The reaction conditions for the further polymerization in step c) can be varied within wide limits. Thus, the reaction temperatures can be between 180° C. and 290° C., preferably from 230° C. to 270° C., particularly preferably from 230° C. to 250° C.

The reaction times can be from 10 minutes to 10 hours, preferably from 20 minutes to 2 hours. It is likewise possible to add defined amounts of water in step c) in order to conduct the further polymerization in a two-phase reaction system. If necessary, further additives such as acids, e.g. acetic acid or hydrogen sulfide or carbon dioxide, can also be added to adjust the base strength of the system.

In a preferred embodiment of the invention, the total reaction time in the steps a) and c) is at most five hours and the reaction temperature is at most 250° C., so that the sum of the vapor pressures of the components present in the reaction mixture is not more than 10 bar.

Both in step a) and in step c), the polymerization can be carried out, if desired, using additional measures to give molar masses which are as high as possible. Such measures include, for example, the addition of promoters. Known promoters of this type are, for example, alkali metal and alkaline earth metal halides or the alkali metal and alkaline earth metal salts of lower carboxylic acids, in particular sodium acetate. The amount of carboxylates added can be from 1 to 150 mol %, based on sulfide.

A further advantage of the process of the invention is that it can also be carried out continuously. This applies to all substeps a) to c). For example, a continuous reaction procedure can be realized by means of a cascade of stirred reactors, in a flow tube or a combination of both.

The polymer can be isolated by customary methods. The polymer can be separated off by cooling the reaction mixture and simple pressure filtration. However, other methods of separating solids from liquids can also be used, e.g. centrifugation or decantation. The filter cake comprises the polymer and salt. The salt can easily be removed by washing with water.

It is also possible to work up the resulting suspension in a decompression vaporization or by spray drying. In such a procedure, solvents and further low molecular weight substances as main constituents are taken off in vapor form and the polymer and salt are obtained as a substantially dry mixture of solids from which the salt can be washed out. Another advantageous method is pressure filtration of the reaction mixture at a temperature at which the polymer is dissolved in the reaction mixture, with the salt being separated off as a filtration residue. The filtrate contains the dissolved polymer. The polymer crystallizes out on cooling the filtrate and can then be easily separated off by simple filtration (e.g. vacuum filtration).

If more than 5% by weight of water (based on solvent) is added in step c), then the cooling procedure at the end of step c) results in formation of granular particles which can be separated by sieving from solvent, salt and fine particles. Washing the granular particles with water and drying gives the polymer in granular form.

The process of the invention is illustrated below by means of the example of the preparation of polyphenylene sulfide (PPS), but without being restricted thereto.

Sodium sulfide trihydrate is dissolved in NMP at 180° C. in a titanium autoclave. Subsequently, part of the water of hydration is distilled off until an internal temperature of 195° C. is reached at atmospheric pressure. The contents of the autoclave are further heated and at a temperature of 215° C.–220° C. DCB is added in an excess of 3–50 mol %. Polymerization is then carried out for from 30 minutes to 3 hours at 230° C. Excess DCB and part of the NMP are distilled off from the resulting reaction mixture at 230° C. The reaction mixture is admixed with up to 3 mol % of sodium sulfide trihydrate, based on the original amount used, and heated at 250° C. for a further 30 minutes–3 hours. The reactor is then cooled to 140° C. and the resulting suspension is filtered, if desired after dilution with further NMP. The filter cake comprising PPS and sodium chloride is boiled in water, washed a number of times with water and dried.

The melting points of the polyphenylene sulfides are between 270° C. and 305° C., typically from 280 to 295° C. The melt viscosity is in the range from 5 to 1000 Pas, preferably from 20 to 500 Pas. The melt viscosity is stable without additives: at 300° C. it changes by less than 10% over a period of 1 hour.

The sulfur-containing polymers such as polyarylene sulfides, in particular polyphenylene sulfide, prepared by the process of the invention have a high purity and a high quality. Particularly noteworthy is the fact that the polymers have virtually no odor and undergo no discoloration in air at elevated temperatures. The polymers also display favorable behavior when subjected to heat.

The invention further provides a sulfur-containing polymer, e.g. a polyarylene sulfide, prepared by the process of the invention.

The sulfur-containing polymers prepared according to the invention can be processed into moldings by melt extrusion. However, films and fibers having good mechanical properties can also be produced therefrom.

EXAMPLES

Example 1

In a 20 liter titanium autoclave, 1635.7 g of NaSH (59.49% strength), 735 g of NaOH and 471.5 g of sodium acetate are heated to 180° C. in 6250 ml of NMP under nitrogen while stirring. After about 15 minutes at 180° C., about 1360 ml of condensate are distilled off at atmospheric pressure over a period of about 40 minutes. 2752.5 g of DCB (1.07 mol of DCB per mol of sulfide) dissolved in 750 ml of NMP are added and the closed autoclave is heated to 230° C. The autoclave is then held at 230° C. for 2.5 hours and then vented to atmospheric pressure into a condenser. Distillation is continued at atmospheric pressure until the total amount of distillate has reached 3.0 liters. To the concentrated mixture are added 312 g of water, 23.25 g of NaSH and 10 g of NaOH with exclusion of air. The mixture is subsequently heated to 245° C. and stirred at this temperature for 2.5 hours. The pressure in the autoclave is about 8 bar. After cooling, the contents of the autoclave are dispersed in 12 liters of water. The major part of the reaction product is in the form of granular particles, accompanied by finely divided pulverulent material (fines). The granular particles are separated from the fine powder by means of a sieve having a mesh opening of 0.15 mm (100 mesh). The granular particles are washed three times with hot water and dried in a vacuum oven at 110° C. 1538 g of granular material and 265 g of fine pulverulent material were obtained.

The melt viscosity of the granular material was measured at 310° C. and a shear rate of 1200 min$^{-1}$ and was 43.3 Pas.

Thermal analysis of the granular material was carried out by means of DSC. The melting point was 277° C. and the recrystallization temperature was 229° C.

Examples 2 and 3

The experiment of Example 1 was repeated twice in order to test the reproducibility. The results are summarized in Table 1.

TABLE 1

| Example | Yield of granular material g | Yield in % | Yield of fines g | Melting point °C. | Crystallization temperature °C. | Melt viscosity |
|---|---|---|---|---|---|---|
| Example 2 | 1577 | 87 | 237 | 279 | 221 | 368 |
| Example 3 | 1585 | 86 | 252 | 278 | 223 | 525 |

Example 4

In an 8 liter titanium autoclave, 659.5 g of NaSH (59.49% strength), 294 g of NaOH and 188.6 g of sodium acetate are heated to 180° C. in 2500 ml of NMP under nitrogen while stirring. After about 15 minutes at 180° C., about 550 ml of condensate are distilled off at atmospheric pressure over a period of about 40 minutes. 1101 g of DCB (1.07 mol of DCB per mol of sulfide) dissolved in 300 ml of NMP are added and the closed autoclave is heated to 230° C. The autoclave is then held at 230° C. for 2.5 hours and then vented to atmospheric pressure into a condenser. Distillation is continued at atmospheric pressure until the total amount of distillate has reached 1.2 liters. To the concentrated mixture are added 150 g of water, 9.3 g of NaSH and 4 g of NaOH. The mixture is subsequently heated to 245° C. and stirred at this temperature for 2.5 hours. The pressure in the autoclave is about 8 bar. After cooling, the contents of the autoclave are dispersed in 5 liters of water. The major part of the reaction product is in the form of granular particles, accompanied by finely divided pulverulent material. The granular particles are separated from the fine powder by means of a 100 mesh sieve. The granular particles are washed three times with hot water and dried in a vacuum oven at 110° C. 580 g of granular material and 110 g of fine pulverulent material were obtained.

The melt viscosity of the granular material was measured at 310° C. and a shear rate of 1200 min$^{-1}$ and was 76.2 Pas.

Thermal analysis of the granular material was carried out by means of DSC. The melting point was 277° C. and the recrystallization temperature was 218° C.

Examples 5 and 6

The experiment of Example 4 was repeated twice in order to test the reproducibility. The results are summarized in Table 2.

TABLE 2

| Example | Yield of granular material g | Yield in % | Yield of fines g | Melting point °C. | Crystallization temperature °C. | Melt viscosity |
|---|---|---|---|---|---|---|
| Example 5 | 560 | 81 | 134 | 275 | 214 | 699 |
| Example 6 | 525 | 76 | 178 | 279 | 220 | 509 |
| Example 7 | 605 | 86 | 96 | 280 | 228 | 236 |

Example 7

The experiment of Example 4 was repeated, but using 63 g rather than 188.6 g of sodium acetate. The results are shown in Table 2.

We claim:

1. A process for preparing sulfur-containing polymers from at least one sulfide and at least one aromatic dihalo compound in a solvent, which comprises a) reacting the sulfide with a stoichiometric excess of aromatic dihalo compound, b) removing from 30 to 100% of the excess aromatic dihalo compound by distillation or by steam distillation, and c) further polymerizing the mixture.

2. The process as claimed in claim 1, wherein the stoichiometric excess of aromatic dihalo compound in step a) is from 1 to 200%.

3. The process as claimed in claim 1 or 2, wherein the excess aromatic dihalo compound is removed in step b) when the conversion based on sulfide in step a) has reached a value in the range of 40–99%.

4. The process as claimed in claim 1, wherein the mean molar mass $M_w$ after step a) is in the range from 1,000 to 30,000 g/mol.

5. The process as claimed in claim 1, wherein, 50–99% of the excess aromatic dihalo compound is removed in step b).

6. The process as claimed in claim 1, wherein the concentration of the sulfur-containing polymer in the reaction mixture is increased after step b) by distilling off solvent and other volatile components.

7. The process as claimed in claim 1, wherein from 0 to 15 mol % of sulfide, based on the amount used in step a), is added after step b).

8. The process as claimed in claim 1, wherein from 1 to 150 mol %, based on the sulfide, of a carboxylate of the alkali metals or alkaline earth metals is added to the reaction mixture in step a) and/or c).

9. The process as claimed in claim 1, wherein from 2 to 20% by weight of water, based on the solvent, is added to the reaction mixture before or during step c).

10. The process as claimed in claim 1, wherein the reaction temperature is less than 250° C., the total reaction time in steps a) and c) does not exceed 5 hours and the maximum pressure reached in the reactor is less than 10 bar.

11. The process as claimed in claim 1, wherein the sulfur-containing polymer is a polyarylene sulfide.

12. The process as claimed in claim 1, wherein the stoichiometric excess of aromatic dihalo compound in step a) is from 3–100% and the excess aromatic dihalo compound is removed in step b) when the conversion based on sulfide in step a) has reached a value in the range of 50–98%.

13. The process as claimed in claim 1, wherein the stoichiometric excess of aromatic dihalo compound in step a) is from 5–50% and the excess aromatic dihalo compound is removed in step b) when the conversion based on sulfide in step a) has reached a value in the range of 60–97%.

14. The process as claimed in claim 1, where the mean molecular mass $M_W$ after step a) is in the range from 2,000 to 20,000 g/mol.

15. The process as claimed in claim 1, where the mean molecular mass $M_w$ after step a) is in the range from 3,000 to 15,000 g/mol.

16. The process as claimed in claim 1, wherein 50–99% of the excess aromatic dihalo compound is removed in step b).

17. The process as claimed in claim 1, wherein 70–98% of the excess aromatic dihalo compound is removed in step b).

18. The process as claimed in claim 1, wherein from 0.1 to 5 mol % of sulfide, based upon the amount used in step a), is added in step b).

19. The process as claimed in claim 1, wherein from 0.5 to 3 mol % of sulfide, based upon the amount used in step a), is added in step b).

20. The process as claimed in claim 1, wherein the sulfur-containing polymer is polyphenylene sulfide.

* * * * *